(12) United States Patent
Rizzardo et al.

(10) Patent No.: US 6,235,857 B1
(45) Date of Patent: May 22, 2001

(54) CONTROL OF MOLECULAR WEIGHT AND END-GROUP FUNCTIONALITY IN POLYMERS

(75) Inventors: Ezio Rizzardo, Wheelers Hill; San Hoa Thang, Clayton South; Graeme Moad, Kallista; Yen Kwong Chong, Doncaster East, all of (AU)

(73) Assignees: Commonwealth Scientific and Industrial Research Organisation, Australian Capital Territory (AU); E.I. DuPont DeNemours and Company, Wilmington, DE (US)

( * ) Notice: Subject to any disclaimer, the term of this patent is extended or adjusted under 35 U.S.C. 154(b) by 0 days.

(21) Appl. No.: 09/066,362

(22) PCT Filed: Oct. 4, 1996

(86) PCT No.: PCT/AU96/00622

§ 371 Date: Apr. 3, 1998

§ 102(e) Date: Apr. 3, 1998

(87) PCT Pub. No.: WO97/13792

PCT Pub. Date: Apr. 17, 1997

(30) Foreign Application Priority Data

Oct. 6, 1995 (AU) .................................................. PN5855

(51) Int. Cl.⁷ ...................................................... L08F 2/38
(52) U.S. Cl. ...................... 526/220; 526/225; 526/292.5; 526/344
(58) Field of Search .................................. 526/220, 225, 526/292.5, 344

(56) References Cited

U.S. PATENT DOCUMENTS

| | | |
|---|---|---|
| 4,052,546 | 10/1977 | Stanaback . |
| 5,773,543 * | 6/1998 | Rizzardo et al. ..................... 526/215 |
| 5,932,675 * | 8/1999 | Rizzardo et al. ..................... 526/289 |

FOREIGN PATENT DOCUMENTS

| | | |
|---|---|---|
| 66169/90 | 5/1991 | (AT) . |
| 42309/93 | 11/1993 | (AT) . |
| 42310/93 | 11/1993 | (AT) . |
| 80544/94 | 5/1995 | (AT) . |
| 83396/87 | 6/1998 | (AT) . |

OTHER PUBLICATIONS

Grant, J. ed. Hackh's Chemical Dictionary, p. 534–535.*

* cited by examiner

Primary Examiner—Robert Dawson
Assistant Examiner—Jeffrey B. Robertson
(74) Attorney, Agent, or Firm—Bacon & Thomas

(57) ABSTRACT

This invention relates to a process for the production of lower molecular weight polymers by free radical-initiated polymerization of unsaturated species characterized by the use of an unsaturated compound of Formula I as a chain transfer agent:

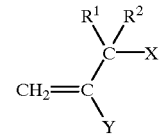

Formula I wherein $R^1$ and $R^2$ are the same or different and are selected from the group consisting of hydrogen, optionally substituted alkyl, optionally substituted saturated or aromatic carbocyclic or heterocyclic ring, and halogen;

X is selected from the group consisting of chlorine, bromine, optionally substituted alkylsulfonyl, and optionally substituted arylsulfonyl, Y is selected from the group consisting of halogen, a polymer chain, and $CR^3R^4Z$, wherein $R^3$ and $R^4$ are the same or different and are selected from the group consisting of hydrogen, optionally substituted alkyl, optionally substituted saturated, unsaturated or aromatic carbocyclic or heterocyclic ring, and halogen; and Z is selected from the group consisting of chlorine, bromine, optionally substituted alkylsulfonyl and optionally substituted arylsulfonyl;

provided that when X is optionally substituted alkylsulfonyl or optionally substituted arylsulfonyl, Y is not halogen.

The invention also relates to various polymers produced by this process and products comprising these polymers. The process of the invention may also be used in the preparation of A-B type block copolymers.

15 Claims, No Drawings

CONTROL OF MOLECULAR WEIGHT AND END-GROUP FUNCTIONALITY IN POLYMERS

The invention relates to processes for the production of polymers, including block, graft, homo and copolymers, of controlled molecular weight by free radical-initiated polymerization of unsaturated species in the presence of unsaturated halogen or sulfonyl-containing compounds, and such polymers with halogen or sulfonyl-containing end-groups produced by such processes. The polymers produced may also have olefinic end-groups. The invention also relates to novel graft copolymers formed using the polymers from this process, and block copolymers produced by this process.

In polymerization processes, it is necessary to be able to control the molecular weight of the polymer so that the product may be fitted to a particular use or need. For example, when an uncontrolled polymerization tends to produce very high molecular weight polymers, it may be necessary to limit the molecular weight and this must be done in a predictable and controllable fashion. In addition, polymers of limited molecular weight are particularly useful as precursors in the manufacture of other polymeric materials and as additives or components of formulations for plastics, elastomers and surface coating compositions, as well as being useful in their own right in many applications.

In conventional free radical-initiated polymerization, there are a number of ways of molecular weight reduction leading to a solution to the above problems. The most common method involves the use of additional initiator which acts as a free radical source or the use of the normal quantity of initiator in conjunction with a chain transfer agent (hereinafter referred to as "CTA"). If a CTA is used at least a part of this agent is incorporated into the polymer molecule. Ideally, molecular weight control must be achieved in such a way as to not introduce undesirable functionality into the polymer.

Although the use of CTAs offers a means of effecting molecular weight control, those in current use have a number of disadvantages. For example, the CTAs used in conventional free radical-initiated polymerization processes are alkanethiols which possess an objectionable odour and can lead to a wide distribution of molecular weights in batch polymerizations with certain monomers. Additionally, the use of thiols causes the incorporation of a sulphur atom into the polymer chain which can result in premature discoloration of the polymer, which is especially deleterious in the coatings industry. Furthermore, there is little scope with thiols for the chain transfer constant to be optimized for some particular vinyl polymerizations. Carbon tetrachloride which is frequently used in the polymer industry as a CTA is falling into disuse because it is toxic and an ozone depleting substance.

Existing addition/fragmentation transfer agents such as substituted vinyl ethers and allyl sulphides assist in overcoming many of the disadvantages of thiols and allow the installation of a number of different types of functional groups at the end of polymer molecules. However, these agents may have inappropriate chain transfer constants and/or give significant retardation of polymerisation with methyl acrylate, vinyl acetate and vinyl halides.

Olefinic end-functional polymers (often called "macromonomers" or "macromers") are important as building-blocks for block and graft copolymers and polymer networks. Homo- and co-polymers of such macromers give rise to comb-type polymers with structures like those normally obtained by graft polymerization. Such homo- and co-polymers of macromers are useful inter alia as suspending/dispersing agents, compatibilisers or surfactants.

Several chloroallyl transfer agents for use in vinyl acetate polymerization have been described e.g. allyl chloride, methallyl chloride, 3-chloro-3-methylbut-1-ene and 1-chloro-3-methylbut-2-ene. These compounds differ from those of the present invention in that they do not possess a substituent Y=halogen and they are described as giving significant retardation. The transfer agents described in the present invention also have transfer constants appropriate for use with vinyl acetate, vinyl chloride and methyl acrylate polymerization.

According to one aspect of the present invention there is provided a process for the production of lower molecular weight polymers by free radical-initiated polymerization of unsaturated species characterized by the use of an unsaturated compound of Formula I as a chain transfer agent:

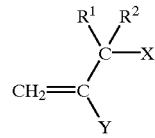

Formula I wherein $R^1$ and $R^2$ are the same or different and are selected from the group consisting of hydrogen, optionally substituted alkyl, optionally substituted saturated, unsaturated or aromatic carbocyclic or heterocyclic ring and halogen;

X is selected from the group consisting of chlorine, bromine, optionally substituted alkylsulfonyl, and optionally substituted arylsulfonyl, Y is selected from the group consisting of halogen, a polymer chain and $CR^3R^4Z$, wherein $R^3$ and $R^4$ are the same or different and are selected from the group consisting of hydrogen, optionally substituted alkyl, optionally substituted saturated or aromatic carbocyclic or heterocyclic ring, and halogen; and Z is selected from the group consisting of chlorine, bromine, optionally substituted alkylsulfonyl and optionally substituted arylsulfonyl;

provided that when X is optionally substituted alkylsulfonyl or optionally substituted arylsulfonyl, Y is not halogen.

In a preferred embodiment $R^1$ and $R^2$ are selected from hydrogen, methyl, ethyl, propyl, isopropyl, butyl, isobutyl, sec-butyl, tert-butyl, phenyl, biphenyl, naphthyl, chlorine and fluorine. More preferably $R^1$ and $R^2$ are selected from hydrogen, methyl, phenyl, chlorine and fluorine. Most preferably $R^1$ and $R^2$ are both hydrogen.

Suitable alkylsulfonyl and arylsulfonyl include p-toluenesulfonyl ("tosyl"), methanesulfonyl ("mesyl"), trifluoromethanesulfonyl and benzenesulfonyl.

In a further preferred embodiment when Y is $CR^3R^4Z$, $R^3$ and $R^4$ are selected from hydrogen, methyl, ethyl, propyl, isopropyl, butyl, isobutyl, sec-butyl, tert-butyl, phenyl, biphenyl, naphthyl, tosyl, mesyl, trifluoromethanesulfonyl, benzenesulfonyl, chlorine and fluorine. More preferably $R^3$ and $R^4$ are selected from hydrogen, methyl, phenyl, tosyl, mesyl, chlorine and fluorine. Most preferably $R^3$ and $R^4$ are both hydrogen.

According to another aspect of the present invention there is provided the use of an unsaturated compound of general Formula I as a chain transfer agent in a process for the production of lower molecular weight polymers by free radical-initiated polymerization of an unsaturated species.

The term "optionally substituted" as used herein means that a group may or may not be substituted with one or more substituents which do not interfere with or participate in the polymerization process. Examples of such substituents include alkyl, aryl, hydroxyalkyl, aminoalkyl, carboxylic acid, ester, acyloxy, amide, nitrile, haloalkyl, alkoxy, phosphonate, sulfonate, silyl or silyloxy group. When used in relation to a moiety containing a ring, the term "optionally substituted" further means that the moiety may or may not have substituent groups directly or indirectly attached to the ring by means of a methylene group or other side chain. Any such substituent groups do not take part in the actual lowering of the molecular weight but may be capable of subsequent chemical reaction. If the substituent is capable of subsequent reaction, the lower molecular weight polymer containing such reactive substituent group is thereby able to undergo further chemical transformation, such as being joined with another polymer chain. Suitable reactive substituents includes hydroxy, amino, halogen, allyl, cyano, epoxy, carboxylic acid and its derivatives, such as esters and the like.

The optionally substituted alkyl groups may contain up to 32 carbon atoms and be straight chained or branched. Examples of straight chained and branched alkyl include methyl, ethyl, propyl, isopropyl, butyl, isobutyl, sec-butyl, tert-butyl, amyl, isoamyl, sec-amyl, 1,2-dimethylpropyl, 1,1-dimethylpropyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2,-trimethylpropyl, 1,1,2-trimethylpropyl, heptyl, 5-methylhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3,-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyloctyl, 1-, 2-, 3-, 4- or 5-ethylheptyl, 1-, 2- or 3-propylhexyl, decyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, undecyl 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7- or 8-ethyldecyl, 1-, 2-, 3-, 4-, 5- or 6-propylnonyl, 1-, 2-, 3-, or 4-butyloctyl, 1-2-pentylheptyl and the like.

The term "saturated or aromatic carbocyclic or heterocyclic ring" is used herein in its broadest sense to denote a mono- or poly-cyclic ring structure containing from 3 to 14 atoms, and includes cyclic alkyl, heterocyclyl, aryl and heteroaryl moieties. Examples of "cyclic alkyl" include cyclopropyl, cyclobutyl, cyclopentyl, cyclohexyl, cycloheptyl, cyclooctyl, cyclononyl, cyclodecyl and the like. Examples of "heterocyclyl" include pyrrolidinyl, morpholinyl, thiomorpholinyl, or partially hydrogenated thienyl, furanyl, pyrrolyl, pyrazolyl, oxazolyl, oxazinyl, thiazinyl, pyridinyl, azepinyl and the like. Examples of aryl include phenyl, biphenyl, terphenyl, quaterphenyl, phenoxyphenyl, naphthyl, tetrahydronaphthyl, anthracenyl, dihydroanthracenyl, benzanthracenyl, dibenzanthracenyl, phenanthrenyl and the like . Phenyl is a preferred aryl group. Examples of "heteroaryl" include pyridyl, furanyl, thienyl, pyrrolyl, benzthiazolyl, indolyl, benzofuranyl, benzothiophenyl, pyrazinyl, quinolyl, pyrimidinyl and the like.

The phrase "polymers of lower molecular weight" and "lower molecular weight polymers" as used herein means polymers whose molecular weight is lower than that of the corresponding polymer prepared in the absence of a CTA. The molecular weight of a polymer from a given reaction is dependent upon the ratio of chain transfer agent to monomer. The greater the ratio of CTA to monomer, the lower the molecular weight. The appropriate ratio can be readily calculated using the chain transfer constant for the CTA/monomer combination.

The term "polymer chain" as used herein is used in its broadest sense to mean a molecular chain composed of a series of monomers. Examples of monomers from which the polymer chain can be composed include vinyl esters, vinyl halides, vinyl aromatics, vinylidene halides, acrylic esters, methacrylic esters, unsaturated polyunsaturated hydrocarbons. The polymer chain may also be composed of mixtures of these monomers.

The process of the invention uses the compounds of Formula I as alternatives to thiols or other CTAs such as carbon tetrachloride, to produce polymers of a desired molecular weight with the added advantage that the amount of CTA needed to give a product polymer of a desired molecular weight may be reliably calculated from the chain transfer constant. The compounds of Formula I may be added in pure form or mixed with diluents that allow safer and easier handling. In certain circumstances the compounds of Formula I may also be used in conjunction with conventional chain transfer agents, such as thiols, carbon tetrachloride etc. The process of the invention may be readily adopted by the users of conventional processes using thiols. Little change in the reaction conditions is required other than the substitution of the appropriate quantity of the compound of Formula I for the thiol. The proportion of the compound of Formula I used may be in the range of about 0.01 to about mole percent based on total monomer, with a preferred range about 0.1 to about 10 mole percent.

The process may be operated under the reaction conditions appropriate for free radical-initiated polymerization, i.e., temperatures from about −100° C. to about 200° C. and pressures from below atmospheric to substantially above atmospheric.

The polymerization process can be carried out in bulk, solution, emulsion, suspension or other conventional polymerization modes (batch, semi-batch, continuous or feed process). Sources of free radicals for polymerization processes would be apparent to the person skilled in the art and may include, thermal initiators, such as, $\alpha,\alpha'$-azobisisobutyronitrile, 4,4'-azobis(4-cyanovaleric acid), 2,2'-azobis(2,4-dimethylpentanenitrile), benzoyl peroxide, t-butyl peroxybenzoate, bis(4-t-butylcyclohexyl) peroxydicarbonate, ammonium persulfate and potassium persulfate; photoinitiators, such as, benzoin derivatives, acyl phosphine oxides and champhorquinone tertiary amine; and redox initiators, such as, hydrogen peroxide in combination with a transition metal. Other suitable initiator systems are described in G. Moad and D. Solomon "Chemistry of Free Radical Polymerization" Elsevier, Oxford 1995.

Any unsaturated species susceptible to free radical-initiated polymerization may be used although it should be noted that the chain transfer constant will vary with the species used. The unsaturated species is preferably an unsaturated monomer including vinyl esters, vinyl halides, vinyl aromatics, vinylidene halides, acrylic esters, methacrylic esters, unsaturated or polyunsaturated hydrocarbons or mixtures thereof Examples of these monomers are vinyl esters such as vinyl acetate or vinyl butyrate; vinyl halides such as vinyl chloride or vinyl bromide; vinylidene halides such as vinylidene chloride, vinylidene bromide, alkyl acrylates such as methyl acrylate, ethyl acrylate, butyl acrylate or 2-ethylhexyl acrylate; alkyl methacrylates such as methyl methacrylate, ethyl methacrylate, n-butyl methacrylate or 2-ethylhexyl methacrylate; acrylonitrile; methacrylonitrile; vinyl aromatics such as styrene, p-chloromethylstyrene, 2-vinylpyridine, 4-vinylpyridine or N-vinylpyrrolidone; vinyl ethers such as $CH_2=CHOR$ wherein R is optionally substituted alkyl; or allyl monomers such as allyl ethers, allyl carbonates or diallyl carbonates.

The process of the invention may be used to prepare polymers with chloro-, bromo-alkylsulfonyl or arylsulfonyl end groups which may be used as the basis for further modification of the polymer. For example, Bamford et al. (Bamford, C H, Eastmond, G C, Woo, J, Richards D H, *Polymer Communications* 1982, 32 643) describes a process whereby polymers with bromo- or chloro-end groups may be converted to propagating radicals and thus used to synthesise block copolymers. Such block copolymers also form part of the present invention.

In a further aspect of the present invention there is provided a process for preparing an A-B type block copolymer by free radical-initiated polymerization of a first unsaturated species in the presence of a first chain transfer agent of Formula I:

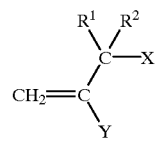

Formula 1 wherein $R^1$ and $R^2$ are the same or different and are selected from the group consisting of hydrogen, optionally substituted alkyl, optionally substituted aryl, and halogen;

X is selected from the group consisting of chlorine, bromine, optionally substituted alkylsulfonyl, and optionally substituted arylsulfonyl;

Y is $CR^3R^4Z$, wherein $R^3$ and $R^4$ may be the same or different and are selected from the group consisting of hydrogen, optionally substituted alkyl, optionally substituted aryl, and halogen; and Z is selected from the group consisting of chlorine, bromine, optionally substituted alkylsulfonyl, and optionally substituted arylsulfonyl; provided that $R^1$ and $R^2$ are both hydrogen and/or $R^3$ and $R^4$ are both hydrogen;

to produce a second chain transfer agent of Formula I wherein Y is a polymer chain, and polymerizing a second unsaturated species in the presence of the second chain transfer agent to produce an A-B type block copolymer of said first and second unsaturated species. In the first chain transfer agent it is preferred that $R^1$, $R^2$, $R^3$ and $R^4$ are each hydrogen.

In a still further aspect of the invention, the process for preparing an A-B type block copolymer by free radical-initiated polymerization is carried out in the presence of a first chain transfer agent of formula I, wherein formula I does not satisfy the general formula $C_4BR_nH_{8-n}$ where n is an integer in the range of 4 to 8.

In this process the transfer agent of Formula I is being used as a "tandem chain transfer agent" agent. This type of process for the formation of an A-B block copolymer is illustrated below in scheme 1 in which monomer A is vinyl acetate.

Tandem Chain Transfer of Vinyl Acetate

First stage

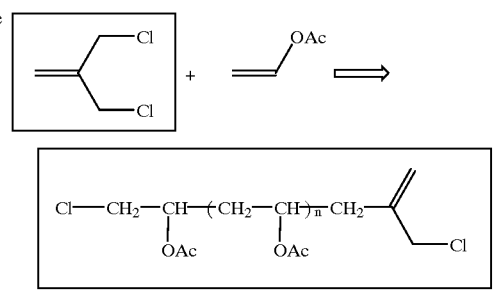

Second stage polymerization

Scheme 1

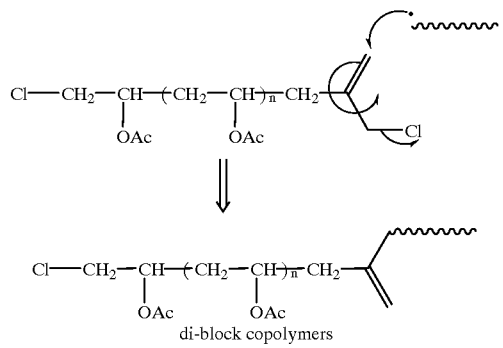

di-block copolymers

The problem of the polymeric chain transfer agent reacting twice in the first stage to produce an A—A block copolymer, and the problem of high molecular weight homopolymer B being produced once the polymeric chain transfer agent is exhausted, can be minimized or overcome by terminating the polymerizations at low conversions.

A further aspect of the process of the invention is that, unlike processes involving thiols or other CTAs, the present process is capable of directly and conveniently producing polymer chains with a terminal polymerizable olefinic end group. For example, the process of the invention can be used to prepare macromonomers, which are useful materials for the preparation of graft copolymers by methods known to the art.

The macromonomers produced may be reactive under the conditions of their production and copolymerise with the remaining monomer. This will limit the concentration of macromonomer obtainable; optimisation of macromonomer yield may require stopping the polymerization at low conversions or changing conditions to limit the reactivity of the olefinic bond of the macromonomer. On the other hand the macromonomer copolymer will be a hyperbranched or a comb polymer, if such is the desired product the reaction may be advantageously carried to high conversion.

The compounds of Formula I may be obtained from a commercial source or via a simple chemical modification of a commercial starting material.

The compounds of Formula I display a high activity in controlling molecular weight in polymerization reactions. The compounds 2,3-dichloropropene (Ia), 3-chloro-2-chloromethyl-l-propene (Ib), 2,3-dibromopropene (Ic), 3-bromo-2-bromomethyl-1-propene (Id), 2-bromo-3-chloropropene (Ie), 3-bromo-2-chloropropene (If), 3-chloro-2-fluoropropene (Ig), 3-bromo-2-fluoropropene (Ih), 2-(chloromethyl)-3-tosylpropene(Ii) and 3-tosyl-2-

(tosylmethyl)propene(Ij) whose formulae are shown below, are examples of preferred compounds of Formula I:

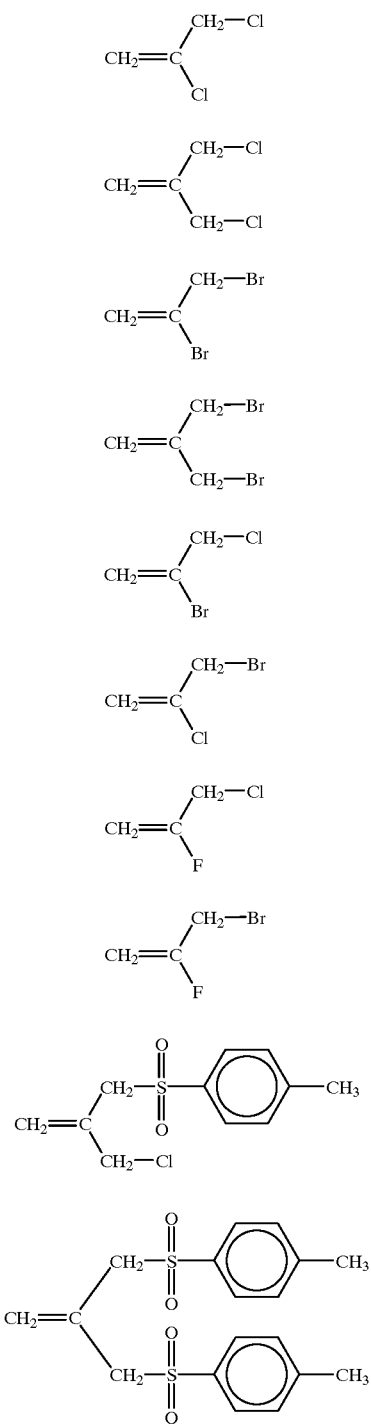

Compounds such as (Ia) and (Ib) of the general Formula I used in the process of the invention display an unexpectedly high activity in controlling molecular weight in polymerization reactions and have chain transfer constants that may be superior to those of thiols, particularly with vinyl acetate, vinyl chloride and alkyl acrylates. Their activity is such that their chain transfer constants can approach the optimum values for batch polymerizations and this activity is not as highly dependent as that of thiols on the structure of the propagating radical. This enables synthesis of polymers with relatively low polydispersity (Mw/Mn<2).

The present process is applicable to the manufacture of synthetic polymers and other polymer formulations where reduced molecular weight and narrow polydispersity aids processing and improves properties. The process can also be used to produce low molecular weight polymers, oligomers, macromonomers and functional polymers for a variety of applications such as high-solid surface coatings, paints and adhesives. Furthermore, the process can be used to enable better control over the polymerization kinetics, e.g., delaying the onset of gelation in cross-linking systems.

Thus, the present invention also provides lower molecular weight polymers, oligomers, macromonomers or functional polymers such as block or graft copolymers whenever produced by the process of the invention.

The present invention also extends to plastics, elastomers, surface coatings, paints, adhesives, compounding agents, modifiers or plasticizers compounding agents, modifiers or plasticizers which are composed wholly or partly of the lower molecular weight polymers whenever produced by the process of the invention.

The operation of this process is demonstrated by the following non-limiting examples. In these examples, molecular weight measurements were performed on a Waters Associates liquid chromatograph equipped with differential refractometer and six $\mu$-styragel columns of 106, 105, 104, 103, 500 and 100 Å pore size. Tetrahydrofuran solvent was used at a flow rate of 1 mL/min. Results were derived by comparison with polystyrene standards using the Chromatix GPC-1 program. The conversions were determined from the mass of the polymers isolated after removal of all the volatiles in vacuo and after subtracting the mass of the CTAs.

The following non-limiting examples illustrate the use of the invention to produce polymers of controlled molecular weight with olefinic, halogen or sulfonyl containing end groups.

EXAMPLE 1

Preparation of Controlled Molecular Weight Olefin-Terminated Polymers of Vinyl Acetate Using 2,3-Dichloropropene (Ia) and 3-Chloro-2-chloromethyl-1-propene (Ib)

Polymerizations of vinyl acetate (VAc) were carried out in vacuo at 60° C. for one hour using the following procedure. α,α'-Azobis-isobutyronitrile (17.4 mg) was dissolved in freshly distilled vinyl acetate (100 mL). Aliquots (10 mL) were removed and added to ampoules containing weighed amounts of CTA [(Ia) or (Ib)]. After the polymerization, the volatiles were removed and the polymers were dried and examined (see Table 1 below).

Proton nuclear magnetic resonance spectroscopy was performed on a low molecular weight sample of poly(vinyl acetate)(entry 9 Table 1; $M_n$ 2940) using CTA (Ia). The $^1$H-NMR spectrum showed signals at δ 3.60–3.85 ppm (multiplets) and 5.20–5.25 ppm which were consistent with the presence of a chloromethylene and an olefinic C=CH2 end group respectively. Similarly, a low molecular weight sample of poly(vinyl acetate) ($M_n$ 4325) prepared by the CTA (Ib) showed signals at δ 3.40–3.60 ppm (multiplets), 4.00 ppm (multiplets) and 4.90, 5.15 ppm (singlet each) which were consistent with the presence of two chloromethylene end groups and an olefmic group.

TABLE 1

Molecular Weights and Conversions for Vinyl Acetate Polymerizations Carried Out at 60° C. in the Presence of CTAs (Ia) and (Ib)

| Example No. | CTA | Time (hr.) | $10^3$[CTA]/ [Monomer] | % Conv. | $M_n$[#] | $M_w/M_n$ |
|---|---|---|---|---|---|---|
| 1.1 | Ia | 1.0 | 0.00 | 15.0 | 117 120 | 1.8 |
| 1.2 | Ia | 1.0 | 0.40 | 14.7 | 108 800 | 1.9 |
| 1.3 | Ia | 1.0 | 0.82 | 12.3 | 78 000 | 1.8 |
| 1.4 | Ia | 1.0 | 1.23 | 9.4 | 36 920 | 1.9 |
| 1.5 | Ia | 1.0 | 1.28 | 7.3 | 37 060 | 1.9 |
| 1.6 | Ia | 1.0 | 2.53 | 2.0 | 9 980 | 2.2 |
| 1.7 | Ia | 1.0 | 3.83 | 1.3 | 7 400 | 1.9 |
| 1.8 | Ia | 1.0 | 4.19 | 2.17 | 7 960 | 1.8 |
| 1.9 | Ia | 2.0 | 13.4 | 1.3 | 2 940 | 1.6 |
| 1.10 | Ib | 1.0 | 0.00 | 14.7 | 138 220 | 2.0 |
| 1.11 | Ib | 1.0 | 1.16 | 9.7 | 22 870 | 1.8 |
| 1.12 | Ib | 1.0 | 2.21 | 7.6 | 11 430 | 1.8 |
| 1.13 | Ib | 1.0 | 3.37 | 6.4 | 7 180 | 1.8 |
| 1.14 | Ib | 2.0 | 6.06 | 6.6 | 4 325 | 1.65 |

[#]Polystyrene standard equivalent number-average molecular weight.

EXAMPLE 2

Polymerization of Controlled Molecular Weight Polymers of Methyl Acrylate Using CTAs (Ia) and (Ib)

Polymerizations of methyl acrylate (MA) were carried out using a stock solution prepared from α,α'-azobisisobutyronitrile (6.5 mg) and distilled methyl acrylate (10 mL). Aliquots (2 mL) were removed and added to ampoules containing thiophene-free benzene (8 mL), and weighed amounts of the CTAs (Ia) or (Ib). After degassing, the mixtures were polymerized at 60° C. for one hour. The volatiles were then removed on rotary evaporator and the polymers were dried in vacuo to constant weight and examined by GPC (see Table 2 below).

TABLE 2

Molecular Weights and Conversions for Methyl Acrylate Polymerizations Carried Out at 60° C. for 1 hour in the Presence of CTAs (Ia) and (Ib)

| Example No. | CTA | $10^2$[CTA]/ [Monomer] | % Convers'n | $M_n$[#] | $M_w/M_n$ |
|---|---|---|---|---|---|
| 21 | Ia | 0.00 | 32.2 | 684 470 | 1.9 |
| 2.1 | Ia | 1.22 | 27.5 | 365 250 | 2.2 |
| 2.3 | Ia | 2.45 | 17.9 | 121 250 | 1.8 |
| 2.4 | Ia | 4.93 | 17.7 | 59 380 | 1.7 |
| 2.5 | Ib | 0.00 | 32.3 | 684 470 | 1.9 |
| 2.6 | Ib | 1.09 | 18.6 | 135 280 | 1.7 |
| 2.7 | Ib | 2.22 | 22.8 | 66 820 | 1.8 |
| 2.8 | Ib | 4.39 | 20.2 | 38 350 | 1.7 |

[#]Polystyrene standard equivalent number-average molecular weight.

As shown in Table 2 above, the molecular weight of the resulting polymer may be reduced to below 10% of the molecular weight in the absence of CTA.

Table 3 summarizes the results of chain transfer constants in polymerizations of vinyl acetate (VAc) and methyl acrylate (MA) using the CTAs (Ia) and (Ib).

TABLE 3

Chain Transfer Constants ($C_x$) for Polymerizations of Common Monomers in the Presence of CTAs

| Monomer | CTA | Temperature | Chain Transfer Constants ($C_x$) |
|---|---|---|---|
| VAc | Ia | 60° C. | 1.23 |
|  | Ib | 60° C. | 3.39 |
| MA | Ia | 60° C. | 0.03 |
|  | Ib | 60° C. | 0.05 |

EXAMPLE 3

Graft Copolymer Poly(vinyl acetate)-graft-poly (methyl acrylate)

Poly(vinyl acetate) macromonomer [produced by the present invention using CTA (Ia)] ($M_n$ 7,960; 0.4 g) was copolymerized with methyl acrylate (1.0 mL) in sulfur free benzene (5.0 mL) using AIBN (15.3 mg) as a free radical initiator. The copolymerization was carried out at 60° C. for three hours to yield the title graft copolymer ($M_n$ 79,100; 1.2 g).

EXAMPLE 4

Polymerization of Vinyl Acetate by Feed Process

A three-necked reactor was equipped with a reflux condenser and a pressure equalizing funnel with metering valve. The reactor was held under nitrogen positive pressure and the following ingredients were used.

| | |
|---|---|
| Part 1 | |
| Vinyl Acetate | 50 ml |
| Methanol | 10 ml |
| Part 2 | |
| CTA (Ia) | 100 mg (Ex 4.1) or |
|  | 505 mg (Ex 4.2) |
| AIBN | 8.7 mg |
| Methanol | 5 ml |

Part 1 was charged to the reactor and heated to reflux (oil bath temperature was set at 80° C.) under nitrogen atmosphere. When the temperature stabilized for 10 minutes, part 2 was charged to the reactor over 100 minutes via a pressure equalizing funnel with metering valve. Then the reaction mixture was held for further 3 hours (Example 4.1) or 24 hours (Example 4.2). The solvent and unreacted monomer were then distilled off. The results are summarized in Table 4 below. In the absence of CTA, the polymerization of vinyl acetate initiated by AIBN (total reaction time: two hours and forty minutes) in methanol gave poly(vinyl acetate) with $M_n$ 131 380 and 34% conversion. The results in Table 4 below demonstrate that the molecular weight can be halved without decreasing conversion of monomer to polymer.

TABLE 4

| Example No. | CTA(Ia) | $M_n$ | $M_w$ | % Conv. |
|---|---|---|---|---|
| 4.1 | 100 mg | 95 190 | 250 555 | 34.4 |
| 4.2 | 505 mg | 62 580 | 215 130 | 43.1 |

EXAMPLE 5

Preparation of Controlled Molecular Weight Poly (Vinyl Chloride) Using 2,3-Dichloropropene (Ia)

Suspension polymerization of vinyl chloride was carried out using the following procedure. First, 25 L of water, 8.5 g of bis(4-t-butylcyclohexyl) peroxydicarbonate, 40 mL of a suspending agent (4% Alcorex 72.5) and an appropriate amount of 2,3-dichloro-1-propene chain transfer agent (CTA, see Table 5) were charged in sequence into a 40 L stainless-steel reactor and then the agitator was started at 300 rev/min. At this stage, the reactor was maintained under reduced pressure for a few minutes and then 3.15 Kg vinyl chloride monomer was charged to the reactor. The agitator speed was increased to 575 rev/min and the temperature of the mixture raised to 50° C. The polymerization was conducted at 50° C. and a pressure of 690 kPa for 3.5 hours. The resulting product was separated by centrifuging, washed, dried and analyzed.

The conversion and molecular weight data are tabulated in the Table 5.

TABLE 5

Molecular weights and conversions for vinyl chloride polymerizations carried out in the presence of 2,3-Dichloropropene (Ia)

| Example No. | [CTA] % | % Conv. | $M_n$ | $M_w$ | K value* |
|---|---|---|---|---|---|
| 5.1 | 0 | 40.6 | 71,630 | 134,230 | 70.3 |
| 5.2 | 0.2 | 30 | 65,870 | 137,880 | 68.5 |
| 5.3 | 1.0 | 30 | 41,420 | 90,530 | 50.2 |

*a measure of molecular weight from the equation:

$$\log \eta = \left[\frac{75 K^2 \times 10^{-6}}{1 + 1.5 \, Kc \times 10^{-3}} + K \times 10^{-3}\right] C$$

EXAMPLE 6

Preparation of Controlled Molecular Weight Olefin-Terminated Polymers of Vinyl Acetate Using 3-bromo-2-chloroprop-1-ene (If)

Synthesis of 3-bromo-2-chloroprop-1-ene (If)

A mixture of 2,3-dichloropropene (5.5 g, 49.5 mmol), sodium bromide 5.16g) and ethyl bromide (37 mL, 495 mmol) in DMF (60 mL) was allowed to heat at 80° C. for 27 hours. After cooling to room temperature, the reaction mixture was diluted with saturated sodium chloride solution, and extracted three times with petroleum spirit 30–40° C. The combined organic layer was washed with water twice and then once with brine. After drying (anhydrous $MgSO_4$) and removing solvent on a rotary evaporator, the title compound (If) was obtained (2.47 g, 32%) after vacuum distillation in a Kugelrohr apparatus (set at 70° C., 25 mmHg). $^1$H-NMR ($CDCl_3$) δ (ppm): 4.09 (s, 2H, $CH_2Br$); 5.40 and 5.59 (2s, 2H, vinylic-H).

Polymerizations

The polymerisations were carried out for one hour in sealed glass tubes in vacuo at 60° C. with AIBN in the manner of example 1. The molecular weights and the chain transfer constants ($C_s$,) derived from the Mayo plots are summarized in Table 6.

TABLE 6

Molecular weight data and chain transfer constant for polymerization of vinyl acetate in the presence of(If)

| CTA | Wt of CTA (mg) | $C_g$ | Wt of polymer (g) | $M_n$# | $M_w/M_n$ |
|---|---|---|---|---|---|
| (If) CH$_2$=C(CH$_2$—Br)(Cl) | 0 | 28.7 | 1.7566 | 177,048 | 2.4 |
| | 11.1 | | 0.1620 | 3,251 | 1.9 |
| | 20.4 | | 0.0857 | 1,631 | 1.6 |
| | 40.2 | | 0.0406 | 1,240 | 1.4 |

Polystyrene equivalent number molecular weight.

EXAMPLE 7

Preparation of Controlled Molecular Weight Styrene-Butadiene Rubber (SBR) by Emulsion Polymerization Using 2, 3-Dichloropropene (Ia)

Emuision polymerization of Styrene-Butadiene was carried out using the standard conditions for polymerization of Styrene-Butadiene which requires oxygen free reaction conditions in bottle reactors rotated in a polymerization bath at approximately 45 RPM and 5° C.

The procedure was as follows:

The following were added to 250 ml bottle reactors fitted with butyl rubber serum-cap liners:

| Reactor Charge | |
|---|---|
| Deionized Water | 98 g |
| Styrene | 14.5 g |
| Butadiene | 35.5 g |
| DRS 40 (surfactant) | 0.675 g |
| Westvaco 1480 (surfactant) | 1.575 g |
| KOH | 0.30 g |
| Darvan WAQ (surfactant) | 0.050 g |
| KCl | 0.15 g |
| EDTA bis-sodium salt | 0.005 g |
| Sodium Dithionite | 0.0125 g |
| 2,3 Dichloropropene (CTA) (Ia) | 0.055 g |
| Initiator Solution | |
| Deionized Water | 2 g |
| NAFE | 0.01 g |
| Sodium Formaldehyde Sulfoxylate | 0.05 g |
| Cumene Hydroperoxide | 0.075 g |

After the bottle reactors with reactants as shown above are brought to equilibrium in the 5° C. bath, the Initiator solution is added via syringe. A sample is withdrawn from the reactor at about 40% monomer conversion and analyzed for molecular weight by Gel Permea-ion Chromatography (GPC). T he sample is stopped from further polymerization by the addition of diethylhydroxyl-amine (DEHA).

After sampling, the polymerization of the remaining emulsion is continued until it is stopped by addition of DEHA when the monomer conversion was about 60%.

A control polymerization was run in the same fashion but without CTA added.

All polymers produced were analyzed by GPC for molecular weight. The conversion and molecular weight data are tabulated in the Table 7.

Table 7:
Molecular weights and conversions for SBR polymerizations carried out in the presence of 2,3-Dichloropropene (Ia)

TABLE 7

Molecular weights and conversions for SBR polymerizations carried out in the presence of 2,3-Dichloropropene (Ia)

| Example No. | [CTA] % | Conversion (%) | $M_n$# | $M_w$ |
|---|---|---|---|---|
| 7.1 | 0.0 | 40 | 358,900 | 1,187,100 |
| 7.2 | 0.0 | 62 | ** | ** |
| 7.3 | 0.11 | 40 | 263,000 | 1,012,000 |
| 7.4 | 0.11 | 62 | 234,200 | 992,795 |

Polystyrene equivalent number molecular weight.
**Too high molecular weight to filter and run on GPC

EXAMPLE 8

Preparation of Controlled Molecular Weight Poly (methyl methacrylate) Using 2-(chloromethyl)-3-tosylpropene (a) Synthesis of 2-(chloromethyl)-3-tosylpropene A solution of 2-(chloromethyl)-3-chloropropene (3.13 g, 25 mmol) and sodium p-toluenesulfmate (4.60 g, 25 mmol) in methanol (50 mL) was heated under reflux for 24 hours. The solvent was evaporated on a rotary evaporator and the residue was extracted between dichloromethane and water. The organic layer was dried (anhydrous MgSO$_4$) and evaporated to give crude product (4.7 g) which, after purification by column chromatography on a silica-gel column using ethyl acetate/n-hexane 1:9 as eluent, gave pure product (2.7 g, 44% yield). $^1$H-NMR (CDCl3) δ (ppm): 2.46 (s, 3H, CH$_3$Ar); 3.92 (s, 2H, CH$_2$SO$_2$); 4.19 (s, 2H, CH$_2$Cl); 5.02 (s, 1H, vinylic-H); 5.45 (s, 1H, vinylic-H); 7.37 and 7.77 (2d, 4H, ArH).

(b) Polymerizations

Polymerizations of methyl methacrylate were carried out in air-free sealed glass tubes at 60° C. with AIBN as initiator. The molecular weights and the chain transfer constant (C$_s$) derived from a Mayo plot are given in Table 8.

This particular transfer agent exhibits weak activity with MMA.

EXAMPLE 9

Preparation of Controlled Molecular Weight Poly (vinyl acetate) Using 2-(tosyl)-3-tosylmethylpropene (a) Synthesis of 2-tosyl-3(tosylmethyl)propene In a 100 mL round bottomed flask, 2-(chloromethyl)-3-chloropropene (1.25 g, 10 mmol), sodium p-toluenesulfinate (5.34 g, 30 mmol) were mixed in methanol (50 mL) and the resulting mixture was heated under reflux. The reaction was followed by thin layer chromatography (silica-gel plate) with ethyl acetate/n-hexane 1:3 as solvent. After 3.5 days, water (50 mL) was added and the mixture of products precipitated out as creamy solids (2.8 g). The pure title compound was obtained (2.19 g, 60%) after column chromatography on a silica-gel column using ethyl acetate/n-hexane 2:3 as eluent. $^1$H-NMR (CDCl$_3$) δ (ppm): 2.45 (s, 6H, 2×CH$_3$Ar); 3.99 (s, 4H, 2×CH$_2$SO$_2$); 5.17 (s, 2H, vinylic-H); 7.34 and 7.72 (2d, 8H, ArH).

(b) Polymerizations

Polymerizations of vinyl acetate were carried out in air-free sealed glass tubes at 60° C. with AIBN as initiator. The molecular weights and the chain transfer constant (C$_s$) derived from a Mayo plot are given in Table 9.

TABLE 8

Molecular weights and conversions for methyl methacrylate polymerizations carried out in the presence of 2-(chloromethyl)-3-tosylpropene

| CTA | Wt of CTA (mg) | $C_g$ | Wt of polymer (g) | $M_n$ | $M_w/M_n$ |
|---|---|---|---|---|---|
| (5.5) 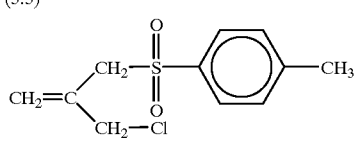 | 0 | 0.05 | 0.18 | 198,402 | 1.9 |
| | 10.1 | | 0.18 | 172,385 | 1.7 |
| | 20.0 | | 0.16 | 126,022 | 1.9 |
| | 40.1 | | 0.18 | 107,121 | 1.75 |

TABLE 9

Molecular weights and conversions for vinyl acetate polymerizations carried out in the presence of 2-tosyl-3-(tosylmethyl)propene

| CTA | Wt of CTA (mg) | $C_g$ | Wt of polymer (g) | $M_n$ | $M_w/M_n$ |
|---|---|---|---|---|---|
| 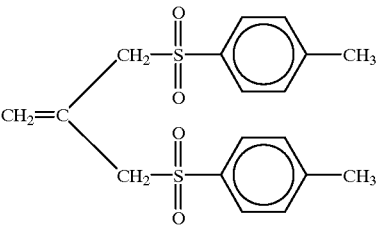 | 0 | 3.9 | 1.4853 | 85,092 | 2.1 |
| | 10.3 | | 1.2977 | 43,794 | 2.1 |
| | 20.3 | | 1.0838 | 32,266 | 1.9 |
| | 40.0 | | 0.9126 | 17,164 | 2.1 |

From the results shown in Table 9, 2-tosyl-3-(tosylmethyl) propene exhibits excellent though mildly degradative chain transfer in vinyl acetate polymerization.

Throughout this specification, unless the context requires otherwise, the word "comprise", or variations such as "comprises" or "comprising", will be understood to imply the inclusion of a stated integer or group of integers but not the exclusion of any other integer or group of integers.

It will be appreciated by persons skilled in the art that numerous variations and/or modifications may be made to the invention as described without departing from the spirit or the scope of the invention, the present examples and specific details are, therefore, to be considered in all respects as illustrative of the invention and are in no way meant to be limitive.

What is claimed is:

1. A process for the production of lower molecular weight polymers by free radical-initiated polymerization of unsaturated species in the pressure of an unsaturated compound of Formula I as a chain transfer agent:

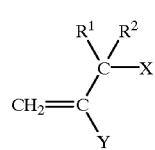

Formula I wherein $R^1$ and $R^2$ are the same or different and are selected from the group consisting of hydrogen, optionally substituted alkyl, optionally substituted saturated or aromatic carbocyclic or heterocyclic ring, and halogen;

X is selected from the group consisting of chlorine, bromine, optionally substituted alkylsulfonyl, and optionally substituted arylsulfonyl, Y is selected from the group consisting of halogen, a polymer chain, and $CR^3R^4Z$, wherein $R^3$ and $R^4$ are the same or different and are selected from the group consisting of hydrogen, optionally substituted alkyl, optionally substituted saturated, unsaturated or aromatir carbocyclic or heterocyclic ring, and halogen; and Z is selected from the group consisting of chlorine, bromine, optionally substituted alkylsulfonyl and optionally substituted arylsulfonyl;

provided that (i) when X is optionally substituted alkylsulfonyl or optionally substituted arylsulfonyl, Y is not halogen, that (ii) when Y is halogen, X is chlorine or bromine, and one of $R^1$ or $R^2$ is substituted alkyl, the first carbon of the substituted alkyl does not have two substituents independently selected from the group consisting of carboxyl, ester, amide, nitrile and aryl, and that (iii) the compound of Formula I does not satisfy the general formula $C_4Br_nH_{8-n}$ where n is an integer in the range of 4 to 8.

2. A process according to claim 1 wherein $R^1$ and $R^2$ are independently selected from hydrogen, methyl, ethyl, propyl, isopropyl, butyl, isobutyl, sec-butyl, tert-butyl, phenyl, biphenyl, naphthyl, chlorine or fluorine.

3. A process according to claim 1 wherein $R^1$ and $R^2$ are independently selected from hydrogen, methyl, phenyl, chlorine or fluorine.

4. A process according to claim 1 wherein X is chlorine or bromine.

5. A process according to claim 1 wherein X is alkylsulfonyl or arylsulfonyl.

6. A process according to claim 5 wherein X is p-toluenesulfonyl, methanesulfonyl, trifluoromethanesulfonyl or benzenesulfonyl.

7. A process according to claim 1 wherein Y is halogen.

8. A process according to claim 1 wherein Y is $CR^3R^4Z$ and $R^3$, $R^4$ and Z have the meanings defined in claim 1.

9. Compounds produced by the process as claimed in claim 1, which compounds are polymers, oligomers, macromonomers or functional polymers.

10. Block or graft polymers produced by the process of claim 1.

11. Plastics, elastomers, surface coatings, paints, adhesives, compounding agents, modifiers or plasticizers comprising a polymer produced by the process of claim 1.

12. A process for preparing an A-B block copolymer by free radical-initiated polymerization of a first unsaturated species in the presence of a first chain transfer agent of Formula I:

Formula I

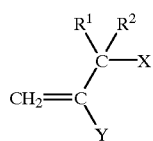

wherein $R^1$ and $R^2$ are the same or different and are selected from the group consisting of hydrogen, optionally substituted alky, optionally substituted saturated or aromatic carbocyclic or aromatic ring, and halogen;

X is selected from the group consisting of chlorine, bromine, optionally substituted alkylsulfonyl and optionally substituted arylsulfonyl;

Y is $CR^3R^4Z$, wherein $R^3$ and $R^4$ may be the same or different and are selected from the group consisting of hydrogen, optionally substituted alkyl, optionally substituted saturated or aromatic carbocyclic or aromatic ring, and halogen; and Z is selected from the group consisting of chlorine, bromine, optionally substituted alkylsulfonyl, and optionally substituted arylsulfonyl; provided that $R^1$ and $R^2$ are both hydrogen and/or $R^3$ and $R^4$ are both hydrogen;

to produce a second chain transfer agent of Formula I wherein Y is a polymer chain, and polymerizing a second unsaturated species in the presence of the second chain transfer agent to produce an A-B block copolymer of said first and second unsaturated species.

13. A process according to claim 1 wherein the compound of Formula I is present in an amount of from about 0.01 to about 30 mole percent based on total monomer.

14. A process according to claim 13 wherein said compound of Formula I is present in an amount of about 0.1 to 10 mole percent.

15. A process according to claim 1 wherein the compound of Formula I is selected from the group consisting of 2,3-dichloropropene, 3-chloro-2-chloromethyl-1-propene, 2,3-dibromopropene, 3-bromo-2-bromomethyl-1-propene, 2-bromo-3-chloropropene, 3-bromo-2-chloropropene, 3-chloro-2-fluoropropene, 3-bromo-2-fluoropropene, 2-(chloromethyl)-3-tosylpropene and 3-tosyl-2-(tosylmethyl)propene.

* * * * *